US006973580B1

(12) United States Patent
Carroll et al.

(10) Patent No.: US 6,973,580 B1
(45) Date of Patent: Dec. 6, 2005

(54) SYSTEM AND METHOD FOR ALERTING COMPUTER USERS OF DIGITAL SECURITY INTRUSIONS

(75) Inventors: Scott Allen Carroll, Cedar Park, TX (US); William Alton Fiveash, Austin, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 860 days.

(21) Appl. No.: 09/615,772

(22) Filed: Jul. 13, 2000

(51) Int. Cl.[7] ............... G06F 11/32; G06F 12/14; H04L 9/32
(52) U.S. Cl. ................... 713/201; 709/203
(58) Field of Search .................. 713/200, 201; 345/710, 741, 742; 709/203

(56) References Cited

U.S. PATENT DOCUMENTS

| | | | |
|---|---|---|---|
| 5,434,562 A * | 7/1995 | Reardon | 713/200 |
| 5,928,363 A * | 7/1999 | Ruvolo | 713/201 |
| 5,974,549 A * | 10/1999 | Golan | 713/200 |
| 5,983,348 A * | 11/1999 | Ji | 713/200 |
| 6,085,224 A * | 7/2000 | Wagner | 709/203 |
| 6,122,664 A * | 9/2000 | Boukobza et al. | 709/224 |
| 6,374,359 B1 * | 4/2002 | Shrader et al. | 713/201 |
| 6,401,125 B1 * | 6/2002 | Makarios et al. | 709/229 |
| 6,460,141 B1 * | 10/2002 | Olden | 713/201 |
| 6,529,938 B1 * | 3/2003 | Cochran et al. | 709/203 |

OTHER PUBLICATIONS

"AtGuard Getting Started Guide," 1999.*
"FAQs About Privacy, Cookies, and Referer Fields," 1999.*
Logue et al., "The unofficial @Guard FAQ," 1998.*

* cited by examiner

Primary Examiner—Andrew Caldwell
Assistant Examiner—Matthew Heneghan
(74) Attorney, Agent, or Firm—Herman Rodriguez; Edmond A. DeFrank

(57) ABSTRACT

The present invention is embodied in a system and method for monitoring and alerting remote client users of digital intrusions of their computers by host servers. In general, the present invention monitors actions taken by host servers relating to information about the remote client and displays graphical alerts when a digital intrusion or a breach of security occurs during a network connection, such as a connection to the Internet, with the host server. Specifically, the present invention monitors certain aspects of the remote client user s interaction with host servers. Based on certain interaction, such as an attempt by the host server to retrieve non-related information about the remote client, the remote client user can be provided with a graphical alert. This allows the remote client user to make an informed decision whether or not to allow certain host server sites to retrieve the client user s personal information.

26 Claims, 4 Drawing Sheets

SYSTEM AND METHOD FOR ALERTING COMPUTER USERS OF DIGITAL SECURITY INTRUSIONS

BACKGROUND OF THE INVENTION

1. Field of the Invention

The present invention relates to a system and method for monitoring and alerting remote client users of digital intrusions of their computers by host servers. In particular, the present invention relates to a system and method for monitoring, by a remote client, actions taken by host servers relating to information about the remote client and alerting the remote client preferably with graphical alerts when a digital intrusion or a breach of security occurs during a network connection, such as a connection to the Internet, with the host server.

2. Related Art

The Internet, via the World Wide Web (WWW), is a graphical and interactive computer environment for conducting electronic commerce, commonly referred to as e-commerce, between remote parties. Typically, a remote client user interacts with information located on a host server via a WWW browser. The browser enables the remote client user to graphically interact with the server. Since numerous remote clients can have access to a given host server, personalized interaction with each remote client, via their browser, is desired. Hence, self contained digital tracking components operating in WWW computer environments (such as the commonly referred to cookies) can be associated with each respective WWW browser program being used by each remote client.

Browser cookies are a common method used by host server WWW sites to gather information about a remote client requestor (remote client browser user) during a browser usage session. A browser cookie association with the remote client can be established by either having the host server site send a cookie to the client browser during a visit to the host server or by having a previously created cookie that resides on the client s browser retrieved by the host server site. The cookies themselves are usually stored in a small binary file that holds information specific to the server host site that created them.

Typically, the cookies include personal information related to the client user, such as the users name, address and other identifying indicia. For e-commerce purposes, cookies make filling out purchase forms easier because it requires gathering information only once from a particular client. As such, on return visits, the host server site can retrieve the cookie associated with the particular client and automatically fill the form out with the particular client s previously gathered information. The cookies can also contain links that were visited by the particular client on the site of the host server. Cookies are usually specific to a site of a particular host server and reside on the client s computer in a memory location, such as a cache directory, for easy and quick access.

However, cookie use by clients and servers can present a security hole for the client. For example, personal and private information about a particular client, where the client has visited and what the client did at the server site, with a host created cookie, can present a privacy breach. Namely, unscrupulous host server sites, not necessarily the host server site that created the cookie, can access and read all cookies of a particular client when the client unknowingly accesses the unscrupulous host server site. This is a problem because the cookies can contain private information about the particular client and the unscrupulous host server can sell this information or use it to violate a client s privacy.

Although several safety functions that are integrated with WWW browsers exist, they are not efficient and do not potentially identify unscrupulous server sites. For example, one integrated safety function is an on/off switch to either allow or disallow all cookie functionality so that host severs cannot originate or retrieve cookies. This is cumbersome and inefficient because many honest and law abiding sites require cookies. If the switch were disabled, the client would not be able to access many legitimate server sites. Therefore, what is needed is a system and method that will provide pertinent information to the client to allow the client to make an informed decision whether or not to allow certain sites to retrieve the client s cookies. What is also needed is a system and method that uses a graphical alert device for detecting suspect cookie retrieval by server sites without unduly interrupting the WWW browsing process.

SUMMARY OF THE INVENTION

To overcome the limitations in the prior art described above, and to overcome other limitations that will become apparent upon reading and understanding the present specification, the present invention is embodied in a system and method for monitoring and alerting remote client users of digital intrusions of their computers by host servers.

In general, the present invention monitors actions taken by host servers relating to information about the remote client and displays graphical alerts to the user when a digital intrusion or a breach of security occurs during a network connection, such as a connection to the Internet, with the host server. It should be noted that although the alert is preferably a graphical alert, it can be any suitable alert, such as an audible alert or a combination audible/visual alert.

Specifically, the present invention monitors certain aspects of the remote client user s interaction with host servers. Based on certain interactions, such as an attempt by the host server to retrieve information unrelated to the current host session, the remote client user can be provided with a graphical alert. This allows the remote client user to make an informed decision whether or not to allow certain host server sites to retrieve the client users personal information.

Typically, personal information about the remote client user is located in a self-contained digital tracking component or packet of information residing on the remote client. The digital tracking component can be a WWW browser cookie defined by a binary file or similar component residing in a memory location, such as a memory cache of the remote client. As such, during WWW browsing by the remote client user, the system and method of the present invention detects and monitors cookie retrieval by host servers and then graphically alerts the remote client user of any suspicious cookie retrieval by server sites without unduly interrupting the WWW browsing process.

The user can designate the definition of what constitutes a suspicious retrieval. A typical example would be a first host site attempting to retrieve cookies generated and used by a second host site. Or, another example of suspicious behavior by a host site is any cookie retrieval or implantation by a host site when no WWW activity has been requested by the client in a reasonable period of time. For example, a host site may be snooping or implanting virus cookies in the background and without the knowledge of the remote client user during a visit or mere viewing of the site. The present invention monitors and alerts the client user of the above activity to prevent security breaches by host server sites.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Introduction

Figure 1:
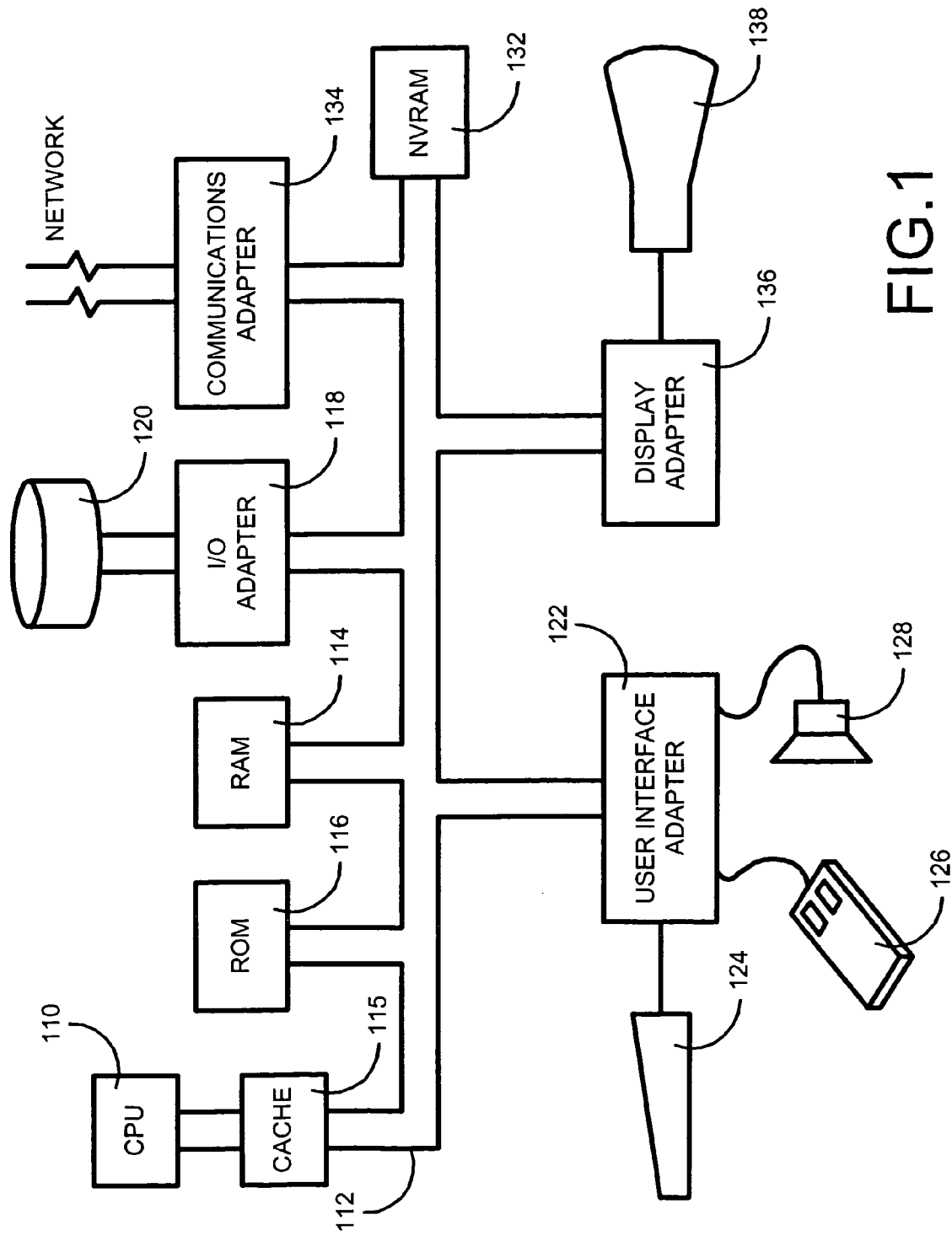
FIG. 1 illustrates a conventional hardware configuration for use with the present invention.

The preferred embodiments may be practiced in any suitable hardware configuration that uses a networked connection, such as the computing system illustrated in FIG. 1 or, alternatively, in a laptop or notepad computing system. The computing system shown in FIG. 1 includes any suitable central processing unit 110, such as a standard microprocessor, and any number of other objects interconnected via system bus 112. For purposes of illustration, the computing system shown in FIG. 1 includes memory, such as cache 115, read only memory (ROM) 116, random access memory (RAM) 114, NVRAM 132, and peripheral memory devices (e.g., disk or tape drives 120) connected to system bus 112 via I/O adapter 118. Computing system 100 further includes a network communications adapter 134, a display adapter 136 for connecting system bus 112 to a conventional display device 138. Also, user interface adapter 122 could connect system bus 112 to other user controls, such as keyboard 124, speaker 128, mouse 126, and a touchpad (not shown).

One skilled in the art readily recognizes how conventional computers and computer programs operate, how conventional input device drivers communicate with an operating system, and how a user conventionally utilizes a input devices to initiate the manipulation of objects in a graphical user interface.

A graphical user interface (GUI) and operating system (OS) of the preferred embodiment reside within a computer-readable media and contain device drivers that allows one or more users to initiate the manipulation of displayed object icons and text on a display device. Any suitable computer-readable media may retain the GUI and operating system, such as ROM 116, RAM 114, disk and/or tape drive 120 (e.g., magnetic diskette, magnetic tape, CD-ROM, optical disk, or other suitable storage media).

In the preferred embodiments, the COSE.™. (Common Operating System Environment) desktop GUI interfaces the user to the AIX. ™. operating system. The GUI may be viewed as being incorporated and embedded within the operating system. Alternatively, any suitable operating system or desktop environment could be utilized. Examples of other GUIs and/or operating systems include X11.™. (X Windows) graphical user interface, Sun's Solaris.™. operating system, and Microsoft's Windows 95.™. operating system. While the GUI and operating system merely instruct and direct CPU 110, for ease in explanation, the GUI and operating system will be described as performing the following features and functions.

II. General Overview of the Components

Figure 2:
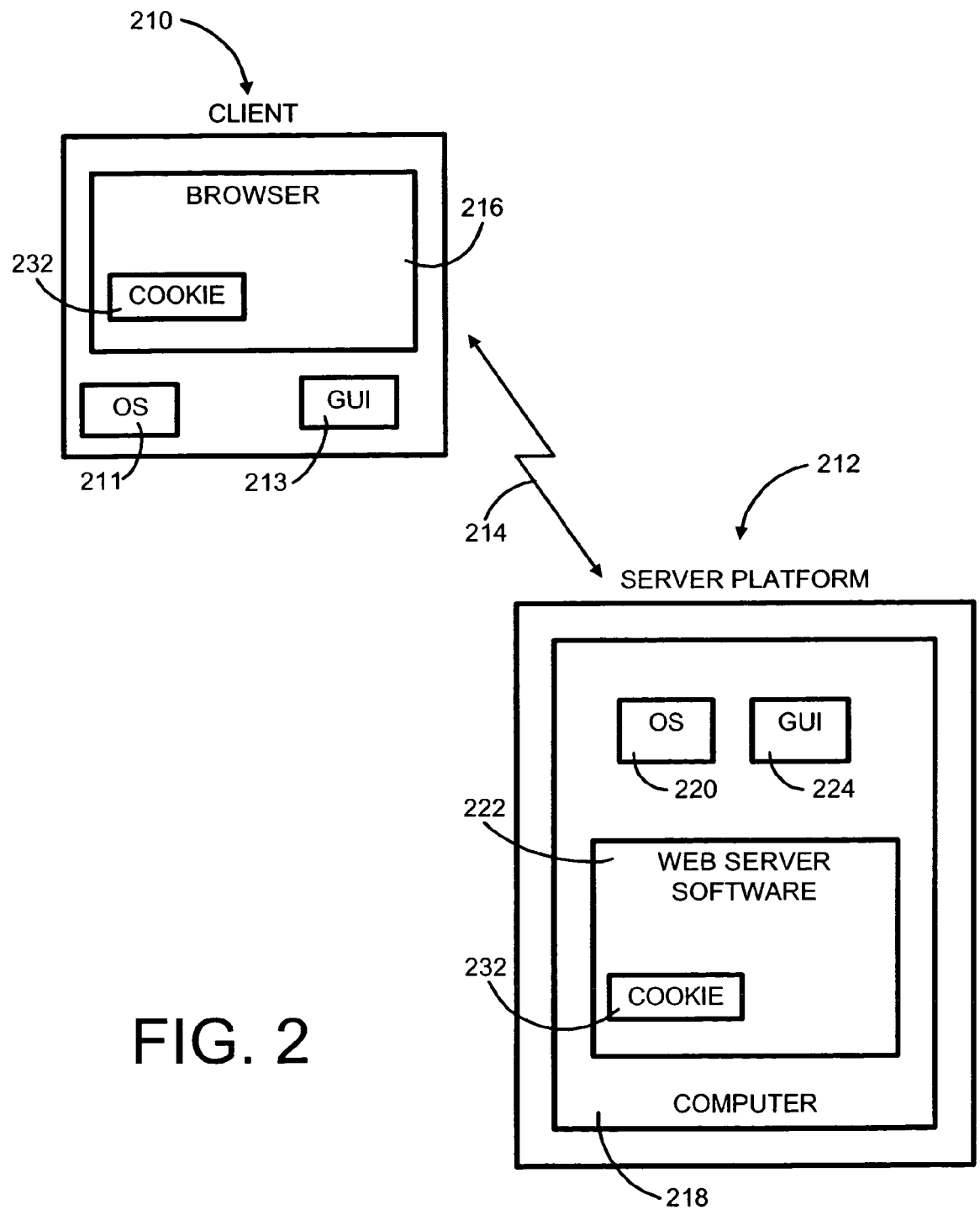
FIG. 2 is a block diagram showing further details of selected components of a network system implementing the present invention.

FIG. 2 is a block diagram showing further details of selected components of a network system implementing the present invention. A representative system in which the present invention is implemented is illustrated in FIG. 1. A client machine 210 is connected to a Web server platform 212 via a communication channel 214. For illustrative purposes, channel 214 is the Internet, an intranet or other known network connection. Web server platform 212 is one of a plurality of servers that are accessible by clients, one such client being illustrated by machine 210. A representative client machine includes an operating system 211, a graphical user interface 213, and a browser 216. A browser is a known software tool used to access the servers of a network, such as the Internet. Representative browsers include, among others, Netscape Navigator, Microsoft Internet Explorer or the like, each of which are "off-the-shelf" or downloadable software programs.

The Web server platform (sometimes referred to as a "Web" site) supports files in the form of hypertext documents and objects. Although any suitable platform can be used, one representative Web server platform 212, comprises an IBM RISC System/6000 computer 218 running the AIX (Advanced Interactive Executive) Operating System 220 and a Web server program 222, such as Netscape Enterprise Server Version 2.0, that supports interface extensions. The platform 212 also includes a graphical user interface (GUI) 224 for management and administration. The various models of the RISC-based computers are described in many publications of the IBM Corporation, for example, RISC System 6000, 7013 and 7016 POWERstation and POWERserver Hardware Technical Reference, Order No. SA23-2644-00.

AIX OS is described in AIX Operating System Technical Reference, published by IBM Corporation, First Edition (November 1985), and other publications. While the above platform is useful, any other suitable hardware/operating system/Web server combinations may be used.

When a remote client user 210 wishes to connect to a particular host server 212, such as a WWW server, the user typically requests access by specifying the name of the desired host server. In many cases, self-contained digital tracking components 230 (hereinafter referred to as browser cookies) associate a client user with information about the client 210 via the WWW browser. A browser cookie association with the remote client 210 can be established by either having the host server site 212 send a cookie 230 to the client browser during a visit the host server or by having a previously created cookie that resides on the client s browser 216 be retrieved by the host server site. The cookies 230, 232 themselves are usually stored in a small binary file that holds information specific to the server host site that created them and can also contain personal information about the client user. The cookies typically reside on the remote client and are stored in computer readable memory of the remote client, such as a cookie cache to allow quick and easy access to the cookies during interaction with host servers.

The cookies 230, 232 can change depending on the usage of the client 210 or program in a given computer environment. For example, in a networking environment, the cookie 230 can be a dynamic message generated and given by a server 212 to the client 210 based on information associated with the client 210. The client 210 stores the message, for example, in a binary or a text cookie file 232. The cookie 232 can then be sent back to the server 212 each time the client's 210 computer requests a page from the server 212.

The main purpose of cookies is to identify clients and possibly prepare customized Internet or World Wide Web (WWW) pages for the clients. For instance, when a particular client enters a WWW site and cookies are used, the client may be asked to fill out a form providing client information, such as name, interests, private account data, client indicia, etc. This information can be packaged into a cookie and sent to the client's computer. The cookie can be accessible by any suitable computer program, such as a WWW browser, which stores it for later use. Each time the client enters the same WWW site that sent the cookie, the client's WWW browser will send the cookie to that server. The server can then use this information to present the client with custom WWW pages. As such, for example, instead of seeing just a generic welcome page, the client might see a welcome page with the client's name and other information related to the client, such as private account information.

However, cookie use by clients and servers can present a security hole for the client. For example, personal and private information about a particular client, where the client has visited and what the client did at the server site, with a host created cookie, can present a privacy breach. Namely, unscrupulous host server sites, not necessarily the host server site that created the cookie, can access and read all cookies of a particular client when the client unknowingly accesses the unscrupulous host server site. Because the cookies can contain private information about the particular client and the unscrupulous host server can sell this information or use it to violate a client s privacy, this is a problem that the present invention solves.

III. Details of the Operation

Figure 3:
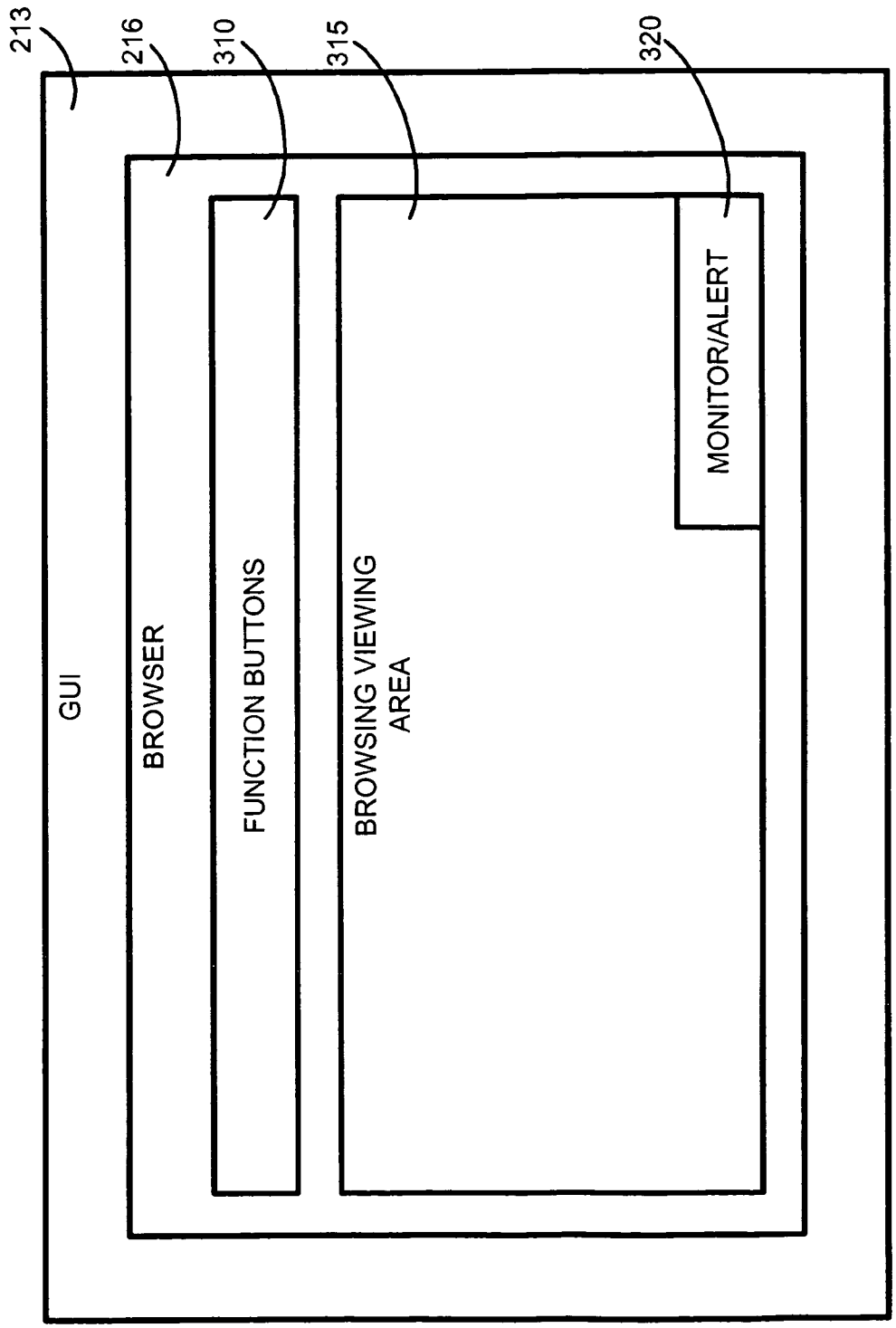
FIG. 3 is a sample user interface illustrating a working example of the present invention operating in a computer environment.

FIG. 3 is a sample user interface illustrating a working example of the present invention operating in a computer environment. The following discussion describes a working example of the present invention as a software implementation operating in a computer environment. The GUI 213 can provide a viewing and interactive area for the browser 216. The browser can be a WWW browser and have browsing function buttons 310 and a browsing viewing area 315 for allowing a remote client user to access and interact with host servers via the World Wide Web of the Internet.

The WWW browser 216 can also have a monitoring and alert function 320 that monitors actions taken by host servers relating to information about the remote client and alerts the remote client with actions taken by the host server. For instance, a digital intrusion can occur when a host server with a particular domain and URL attempts to take a cookie that was not originated by that particular domain or URL. The alert function can notify the remote client when the digital intrusion or the breach of security occurs during a network connection, such as a connection to the Internet, with the host server. The notification can be any suitable notification, such as a visual alert, including a change to the user interface, an audible alert or message or a combination audible/visual alert.

Preferably, the monitoring and alert function 320 is a graphical display located at the bottom or to the side of the WWW browser 216 that displays, in symbolic format, the various cookies that the remote client has residing in a memory location, such as the cookie cache. In operation, when the remote client visits or attaches to a WWW host server site, the monitoring and alert function 320 can be activated. During data communication between the host server and remote client, the monitoring and alert function 320 can monitor the cookie activity between the remote client and the host server. The monitoring and alert function 320 can monitor the cookie symbols in the cookie cache of the remote client and, if a cookie is requested by the server, determine which cookies have the same domain name as the host server site that is requesting the cookies. If the domain name is the same the remote client user can be alerted with a safe symbol or display. For example, the monitoring and alert function 320 can have a portion of the display turn to a solid, safe color, such as blue.

However, while the remote client user is connected to a host server site and there are requests to transfer cookies from other domain names, the monitoring and alert function 320 can have symbolic cache images that start flashing red colors. This red alert display can inform the remote client that a particular host server is trying to take cookies from the remote client s browser cookie cache that are not associated with the host server. The monitoring and alert function 320 then provides the remote client user with several immediate options. One option includes stopping data transfer between the remote client and the host server that is attempting to take cookies that are not associated or that were not created by that host server. Another option is to provide the client user with an option to allow the host server to retrieve that particular cookie. Also, the monitoring and alert function 320 optionally can immediately exit the browser program to prevent the cookie theft. Further, even if the host server that is attempting to take a particular cookie is associated with the cookie or created the cookie, the client user has the option of not allowing the host server to the particular cookie.

In addition, the monitoring and alert function 320 also allows immediate and easy access to vital cookie information relating to each cookie in the cookie cache with graphical display access. For example, when a remote client selects or double clicks on each display device or icon of the cookie cache, the remote user can see vital information (domain name, cookie name, etc.) associated with that cookie.

As a result, the present invention is a more efficient way of allowing regular transactions (cookie exchange to occur) without having to request permission for every cookie transmission. Further, the present invention is a fast visual way of monitoring and detecting cookie access and a way of preventing irregular or illegal requests for cookies that certain host server sites may attempt to perform when they have no reason to request such information. Although plug-in software is available that allows remote clients to remove or flush all cookies or even masquerade a remote client s identification, these plug-ins are not as efficient as the present invention because they often prevent or hinder normal and smooth network transactions from occurring. In contrast, the present invention can utilize a graphical display device for monitoring, detecting and preventing suspect cookie retrieval by server sites without unduly interrupting and hindering the WWW browsing process.

Figure 4:
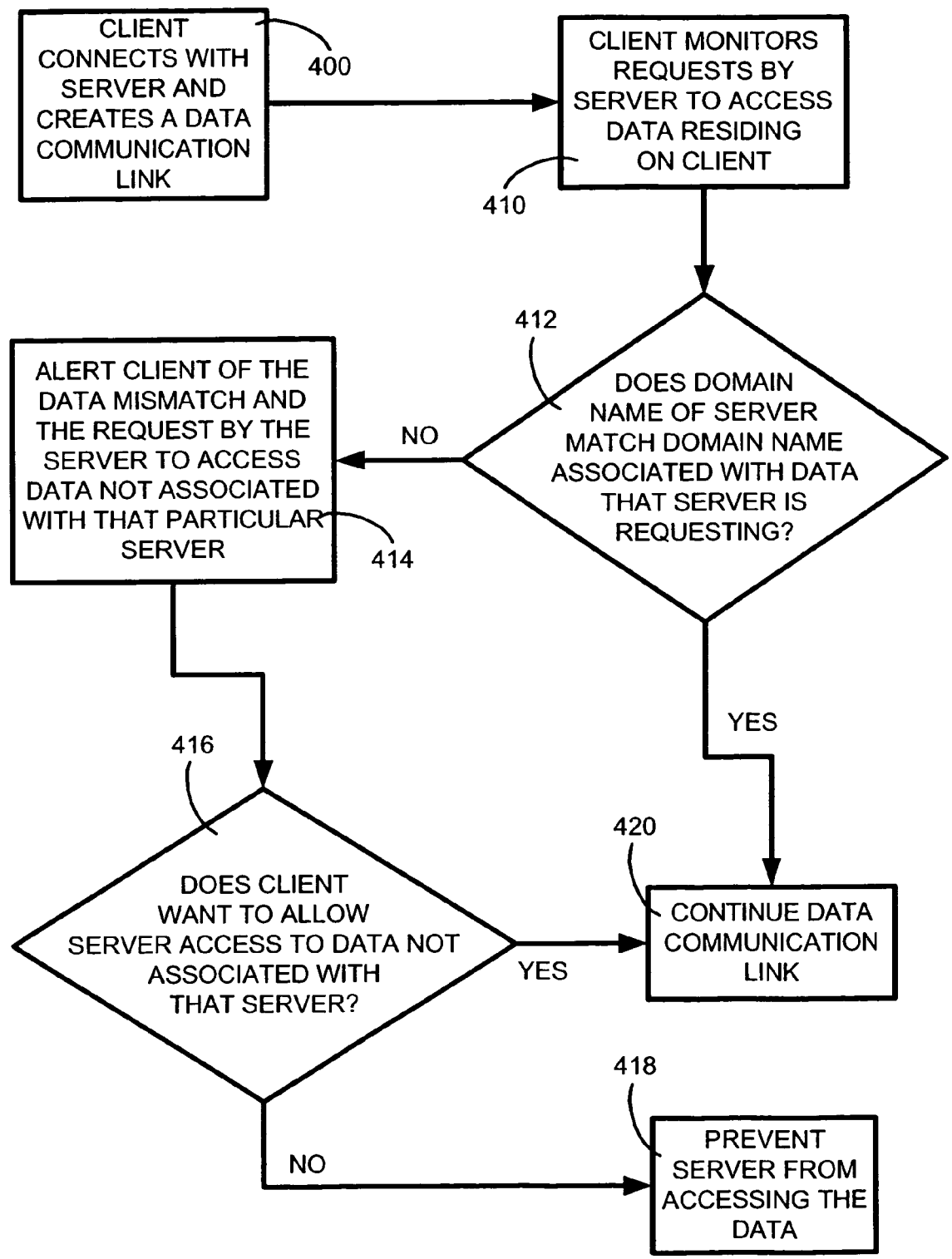
FIG. 4 is flowchart illustrating the operation of the invention.

FIG. 4 is flowchart illustrating the operation of the invention. In a preferred embodiment, first, a remote client connects with a host server and creates a data communication link between the two (step 400). Second, the remote client monitors requests by the host server to access data residing on the remote client (step 410). Third, it is determined whether the domain name of host server matches the domain name associated with data that server is requesting (step 412). If the data does not match, the remote client is alerted of the data mismatch and the request by the host server to access data not associated with that particular server (step 414). Next, it is determined whether the remote client wants to allow the host server access to the data not associated with that server (step 416). If the remote client does not want to allow access to the data, the host sever is prevented from accessing the data (step 418). If the remote client wants to allow access to the data or the data matches from step 412, the host server is allowed access to the data and the data is communication link between the remote client and the host server is continued (step 420).

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-readable medium having computer-executable instructions for performing a process to prevent digital intrusions, the process comprising:
    (a) detecting a request for access by a second computer of a digital tracking component residing on a first computer;
    (b) automatically determining if the second computer is associated with the digital tracking component that is being requested by the second computer;
    (c) in response to determining that the second computer is associated with the digital tracking component, automatically allowing the second computer to access the digital tracking component;
    (d) comparing a domain name of the second computer with a domain name associated with the digital tracking component;
    (e) in response to a match of the domain names, determining that the second computer is associated with the digital tracking component; and
    (f) in response to a mis-match of the domain names, determining that the second computer is not associated with the digital tracking component, wherein a browser operating within the first computer performs steps (a) through (f).

2. The medium of claim 1 further comprising:
    in response to determining that the second computer is not associated with the digital tracking component, alerting a user of the first computer; and
    optionally allowing or preventing access to the digital tracking component by the second computer.

3. The medium of claim 2, wherein the alerting step comprises at least one of sounding an audible alert or displaying a color coded visual alert on the first computer.

4. The medium of claim 1 further comprising:
    in response to determining that the second computer is not associated with the digital tracking component, automatically blocking the second computer from accessing the digital tracking component.

5. The medium of claim 1, wherein the first computer is a remote client and the second computer is a host server.

6. The medium of claim 1, wherein steps (a) through (c) occur without intervention from a user of the first computer.

7. The medium of claim 1, wherein digital communication between the first and second computers occurs on a networked connection comprising a World Wide Web Internet connection.

8. The medium of claim 1, wherein the digital tracking component is a cookie.

9. The medium of claim 1, further comprising:
    in response to a match of the domain names, determining that the second computer previously created the digital tracking component residing on the first computer; and
    in response to a mis-match of the domain names, determining that the digital tracking component residing on the first computer was created by a third computer.

10. A computer-implemented method for protecting a first computer from digital intrusions by a second computer, the method comprising:
    (a) sending by the second computer to the first computer a request for access of a digital tracking component residing on the first computer;
    (b) if the second computer is associated with the digital tracking component that is being requested, the second computer automatically receiving access to the digital tracking component by the first computer;
    (c) if the second computer is not associated with the digital tracking component, the second computer automatically being denied access to the digital tracking component by the first computer;
    (d) comparing a domain name of the second commuter with a domain name associated with the digital tracking component;
    (e) in response to a match of the domain names, determining that the second computer is associated with the digital tracking component; and
    (f) in response to a mis-match of the domain names, automatically determining that the second computer is not associated with the digital tracking component, wherein steps (a) through (f) are performed by a browser operating within the first computer.

11. The computer-implemented method of claim 10, wherein determining if the second computer is associated with the digital tracking component comprises comparing a domain name of the second computer with a domain name associated with the digital tracking component.

12. The computer-implemented method of claim 10, wherein if the second computer is not associated with the digital tracking component, a user of the first computer is alerted.

13. The computer-implemented method of claim 12, wherein after the user of the first computer is alerted, the first user is given an option to allow or prevent access of the digital tracking component by the second computer.

14. The computer-implemented method of claim 12, wherein the alert includes at least one of sounding an audible alert or displaying a color coded visual alert on the first computer.

15. A computer-implemented method for protecting a first computer from digital intrusions by a second computer, comprising:
    (a) detecting a request for access by the second computer of a digital tracking component residing on the first computer;

(b) automatically determining if the second computer is associated with the digital tracking component that is being requested by the second computer;

(c) in response to determining that the second computer is associated with the digital tracking component, automatically allowing the second computer to access the digital tracking component;

(d) comparing a domain name of the second computer with a domain name associated with the digital tracking component;

(e) in response to a match of the domain names, determining that the second computer is associated with the digital tracking component; and (f) in response to a mismatch of the domain names, automatically determining that the second computer is not associated with the digital tracking component, wherein steps (a) through (f) are performed by a browser operating within the first computer.

16. The method of claim 15 further comprising:

in response to determining that the second computer is not associated with the digital tracking component, alerting a user of the first computer; and optionally allowing or preventing access to the digital tracking component by the second computer.

17. The method of claim 16, wherein the alerting step comprises sounding an audible alert or displaying a color coded visual alert on the first computer.

18. The method of claim 15, wherein the first computer is a remote client and the second computer is a host server.

19. The method of claim 15, wherein steps (a) through (c) occur without intervention from a user of the first computer.

20. The method of claim 15, wherein digital communication between the first and second computers occurs on a networked connection comprising a World Wide Web Internet connection.

21. The method of claim 15, wherein the digital tracking component is a cookie.

22. The method of claim 15, further comprising:

in response to a match of the domain names, determining that the second computer previously created the digital tracking component that resides on the first computer; and in response to a mis-match of the domain names, determining that the digital tracking component residing on the first computer was previously created by a third computer.

23. The method of claim 15, further comprising:

in response to determining that the second computer is not associated with the digital tracking component, automatically blocking the second computer from accessing the digital tracking component.

24. A computer security system for preventing host servers from taking inappropriate self-contained packets of information residing on a remote client, the system comprising:

a monitor module that monitors requests for access by the host servers of the self-contained packets of information residing on a remote client during digital communication between the remote client and the host server;

a notify module that sends an alert to the remote client if a domain name associated with a particular host server does not match a domain name associated with one of the self-contained packets of information residing on a remote client that is being requested by the particular host server;

a compare module that compares a domain name of the host server with a domain name associated with the self-contained packet:

wherein the compare module, in response to a match of the domain names, determines that the host server is associated with the self-contained packet;

wherein the monitor module, in response to a mis-match of the domain names, automatically determines that the host server is not associated with the digital tracking component; and wherein the monitor module and the compare module are within a browser operating within the remote client.

25. The computer security system of claim 24, wherein the notify module provides an audible notification to the remote client when a particular host server requests one or more of the self-contained packets of information that contains information that is not associated with the particular host server.

26. The computer security system of claim 24, wherein the monitor module uses a color coded visual alert represented by a graphical display that displays a safe color when one of the host servers requests one or more of the digital tracking components that contains information that is associated with the host server and a warning color when one of the host servers requests one or more of the digital tracking components that contains information that is not associated with the host server.

* * * * *